July 23, 1963 P. B. KING, JR 3,098,961
MOTOR CONTROL FOR SELECTING SHAFT POSITIONS
Filed April 29, 1959 6 Sheets-Sheet 1
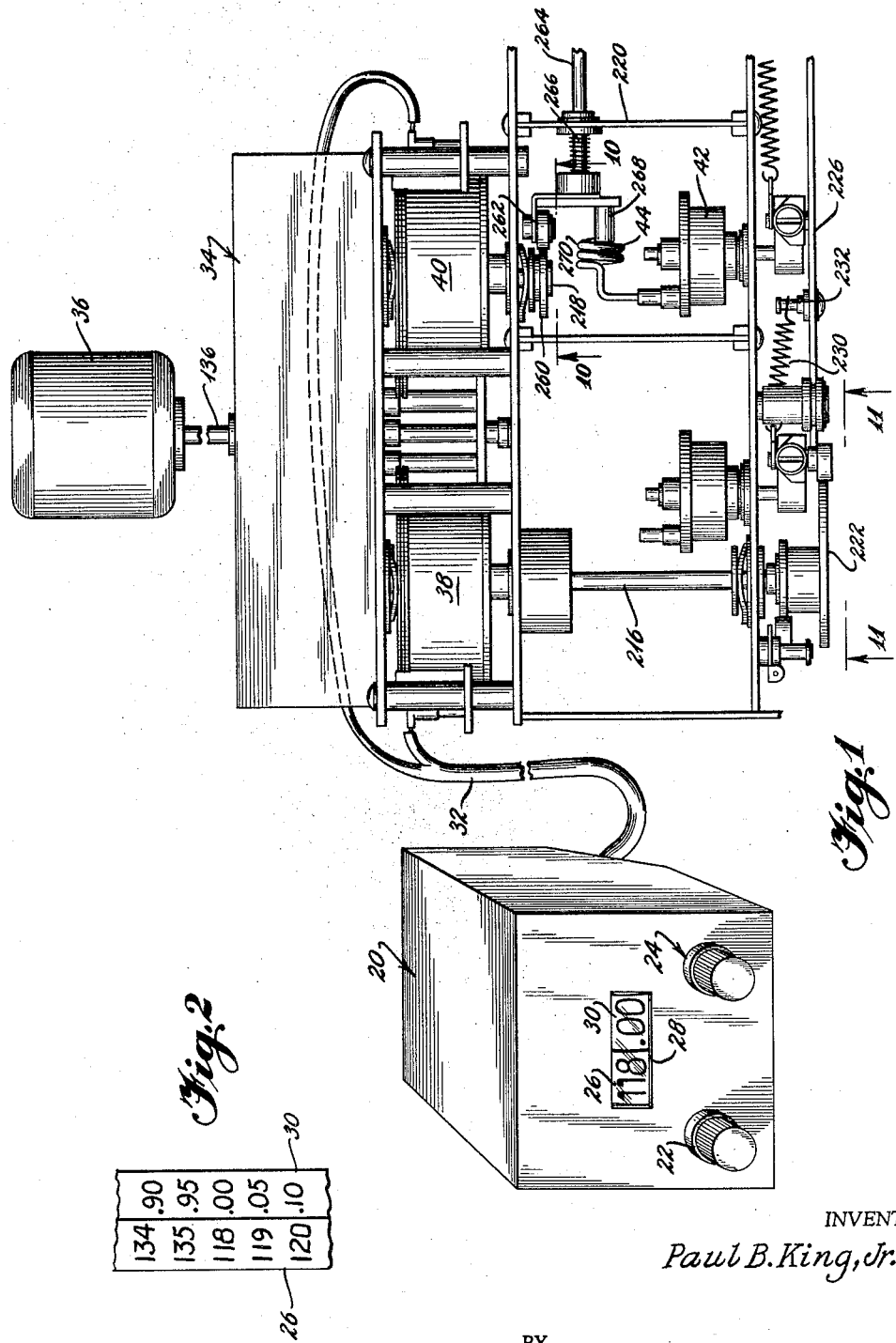
INVENTOR
*Paul B. King, Jr.*
BY
*Mead, Browne, Schuyler & Beveridge*
ATTORNEYS July 23, 1963  P. B. KING, JR  3,098,961
MOTOR CONTROL FOR SELECTING SHAFT POSITIONS
Filed April 29, 1959  6 Sheets-Sheet 2
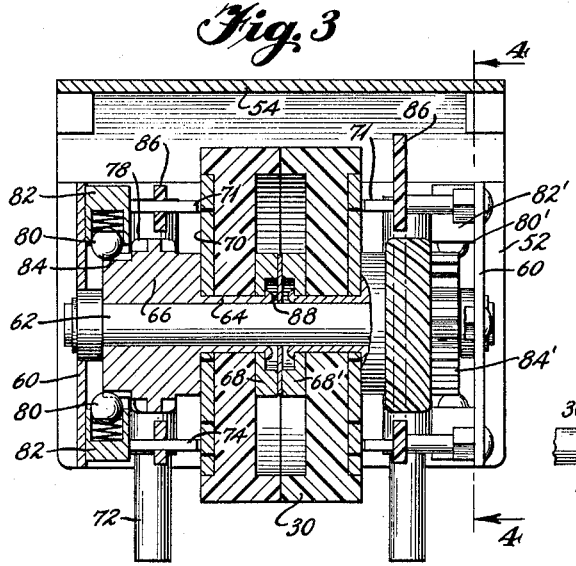
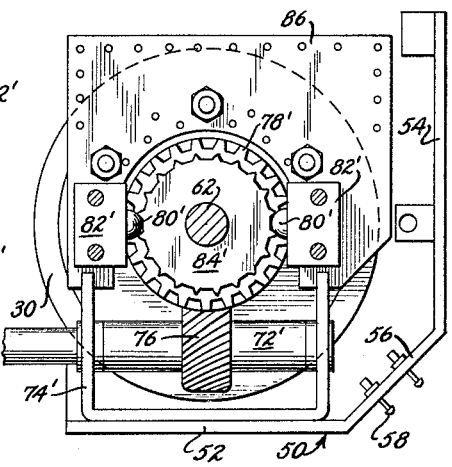
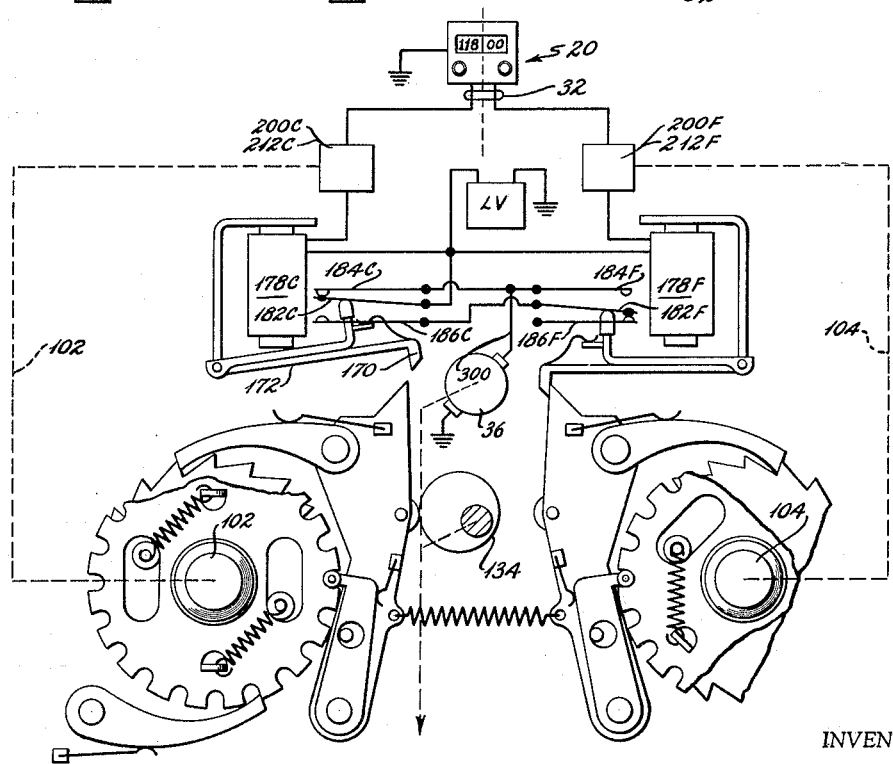
INVENTOR
Paul B. King, Jr.
BY
ATTORNEYS

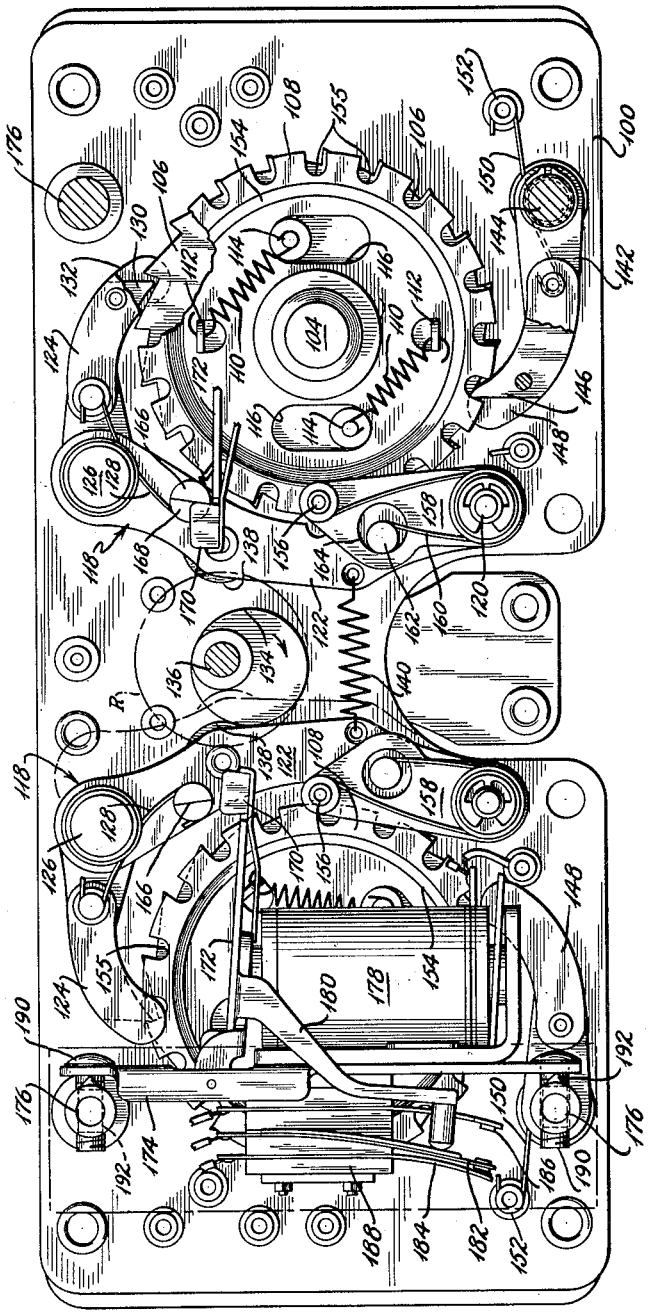

July 23, 1963  P. B. KING, JR  3,098,961
MOTOR CONTROL FOR SELECTING SHAFT POSITIONS
Filed April 29, 1959  6 Sheets-Sheet 4
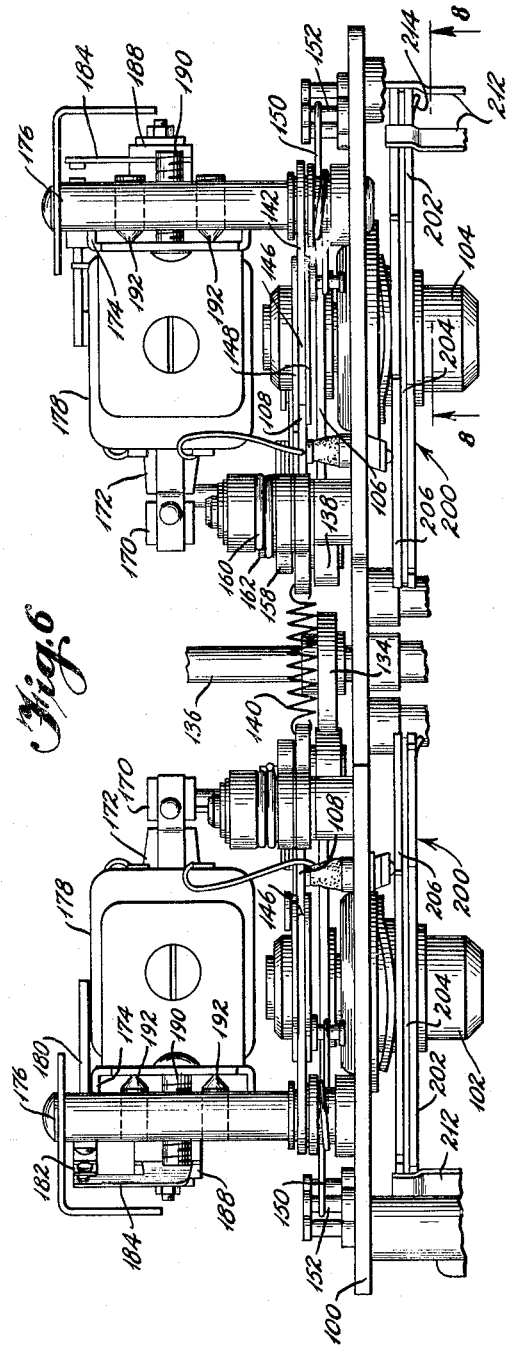
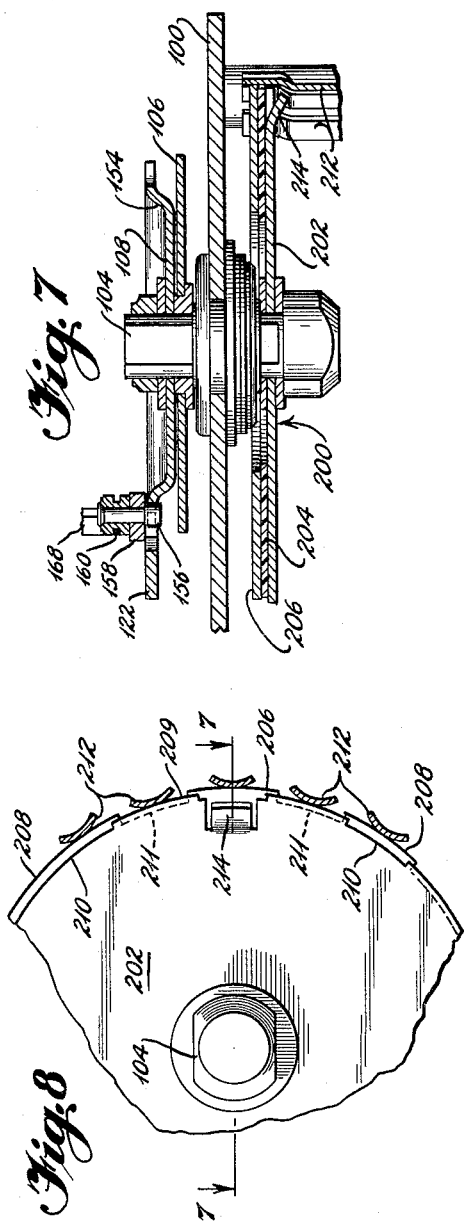
INVENTOR
Paul B. King, Jr.
BY
Mead, Browne, Schuyler & Beveridge
ATTORNEYS July 23, 1963 P. B. KING, JR 3,098,961
MOTOR CONTROL FOR SELECTING SHAFT POSITIONS
Filed April 29, 1959 6 Sheets-Sheet 5

INVENTOR
Paul B.King, Jr.

BY
Mead, Browne, Schuyler & Burridge
ATTORNEYS

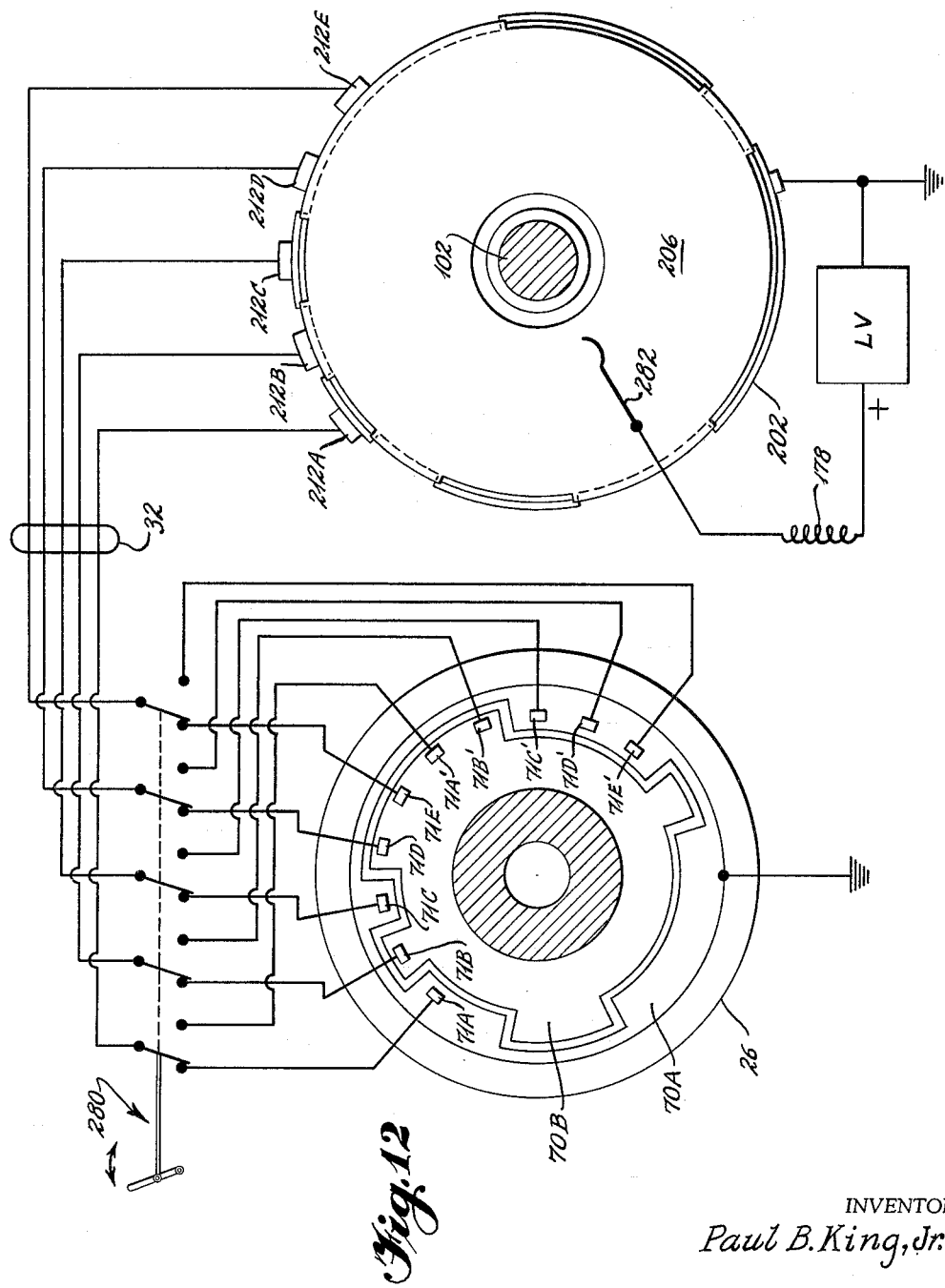

United States Patent Office 3,098,961
Patented July 23, 1963

3,098,961
**MOTOR CONTROL FOR SELECTING
SHAFT POSITIONS**
Paul B. King, Jr., Mountain Lakes, N.J., assignor to Aircraft Radio Corporation, Boonton, N.J., a corporation of New Jersey
Filed Apr. 29, 1959, Ser. No. 809,835
4 Claims. (Cl. 318—467)

This invention relates to control apparatus, and more particularly to apparatus for tuning electrical devices such as radio transmitters or receivers by rotatively positioning a controlled shaft or shafts from a remote location.

It is a primary object of the invention to provide compact and reliable control apparatus for turning one or more controlled shafts to selected positions and positively maintaining the shaft or shafts in the selected positions.

It is another object of the invention to provide control apparatus including rotatable cam assemblies adapted to reciprocate a cam follower over a substantial range of movement in which undesirable forces created by abrupt changes in the radius of the cam are eliminated.

Still another object of the invention is to provide control apparatus wherein a control input made up of two independently selected portions is indicated to the operator as a single number representative of the sum of the respective portions.

A further object of the invention is to provide a control system in which controlled members may be located in either of two different angular positions for each position of a control member at the option of the operator.

A still further object of the invention is to provide a pawl and ratchet drive mechanism for turning a shaft to a selected position with a latch effective to accurately lock the shaft in the selected position independent of movement of the pawl.

In the achievement of the foregoing and other objects, a control apparatus embodying the present invention includes a control station which includes coarse and fine numeral wheels mounted for independent manually controlled rotation. Each numeral wheel with its respective control shaft may be manually positioned at any one of a plurality of rotative positions, the total number of possible control settings being equal to the product of the number of positions on the two numeral wheels.

Each of the numeral wheels has a commutator engaging brushes for setting up coded circuit connections corresponding to the rotative position of the wheel. These connections respectively terminate in brushes engaging commutators on coarse and fine controlled shafts which may be used, for example, to select crystals and manipulate tuning elements of transmitter and/or receiver circuits. In the form illustrated, each controlled shaft carries a cam operable to position a cam follower which in turn adjusts the circuit tuning elements.

Each controlled shaft and cam is driven to its selected position by a pawl and ratchet mechanism. Both pawl assemblies are oscillated to drive their respective ratchets by a common driving force which is energized at all times when the rotative position of either controlled shaft differs from the rotative position selected for the shaft at the control station. The drive is energized through the coding assembly at the control station and a decoding wheel mounted on each controlled shaft. The coding and decoding connections are such that when the particular controlled shaft is rotated to its selected rotative position the circuit to the electrically driven drive motor is opened. When either shaft is at some position other than its selected rotative position, the drive is energized to oscillate the pawl. When either shaft reaches its selected position, the associated pawl assembly is latched in an inoperative position such that continued rotation of the drive motor no longer imparts rotation to the control shaft.

To eliminate the effect of undesirable forces created by the transition of a cam follower along an abrupt change in radius of either cam, alternative constructions are used. In one case the follower positioning cam is constructed with an abrupt transition surface. A second cam having a similar transition surface is mounted upon the same control shaft and oriented in the opposite direction from the follower positioning cam. A second follower bears against the second cam and forces exerted by the follower positioning cam tending to rotate the controlled shaft are counterbalanced by the second cam fixed to the shaft. In a second case, an abrupt transition surface between a maximum radius point and a minimum radius point has been eliminated by electrically interconnecting the control unit and the controlled shaft, and constructing the cam so contiguous positions of the control has corresponding locations on opposite sides of a line through the cam axis and the maximum and minimum radius points.

Two separate sets of brushes are arranged to engage the commutator of the control element or the controlled element. These sets of brushes are angularly offset about the commutator axis so a switch from one set of brushes to the other produces a definite angular displacement between the control and controlled elements. This has particular application in the case of communication transmitter and receiver units designed for optional operation on single channel simplex or double channel simplex modes. By switching between the two sets of brushes the frequency selector for the transmitter can be caused to seek a position 6 megacycles above the frequency to which the receiver is tuned.

A particularly convenient arrangement of the commutator or the controlled element involves a pair of conducting discs separated by an insulator disc and having radially projecting segments of the conducting discs arranged in juxtaposition so a wiper engaging the periphery of the assembly contacts only one of the two conducting discs for any one angular position of the controlled shaft.

To insure proper locking of the controlled elements in the selected angular position, a locking member is resiliently biased against the periphery of a toothed wheel and coupled through a lost motion connection to the pawl for rotating the wheel so the latching member locks with the toothed wheel in the selected angular position during driving movement of the pawl and without interfering with manipulation of the pawl but is retracted upon a complete retraction stroke of the pawl.

Other objects and features of the invention will become apparent by reference to the following specification taken in conjunction with the accompanying drfiawings.

In the drawings:

FIG. 1 is an overall view, partially isometric and partially schematic, of one form of apparatus embodying the invention with certain parts broken away or removed;

FIG. 2 is a development of a portion of the circumference of the numeral wheels of the control box of FIG. 1;

FIG. 3 is a cross-sectional view of the control box of FIG. 1 taken on a horizontal plane passing centrally through the control box;

FIG. 4 is a side elevational view of the control box of FIG. 1 with various cover plates of the control box removed;

FIG. 5 is a plan view, partially in section, of the pawl and ratchet mechanism employed to position the control shafts;

FIG. 6 is a side elevational view of the pawl and ratchet mechanism of FIG. 5;

FIG. 7 is a cross-sectional view of the mechanism of

Figure 10:
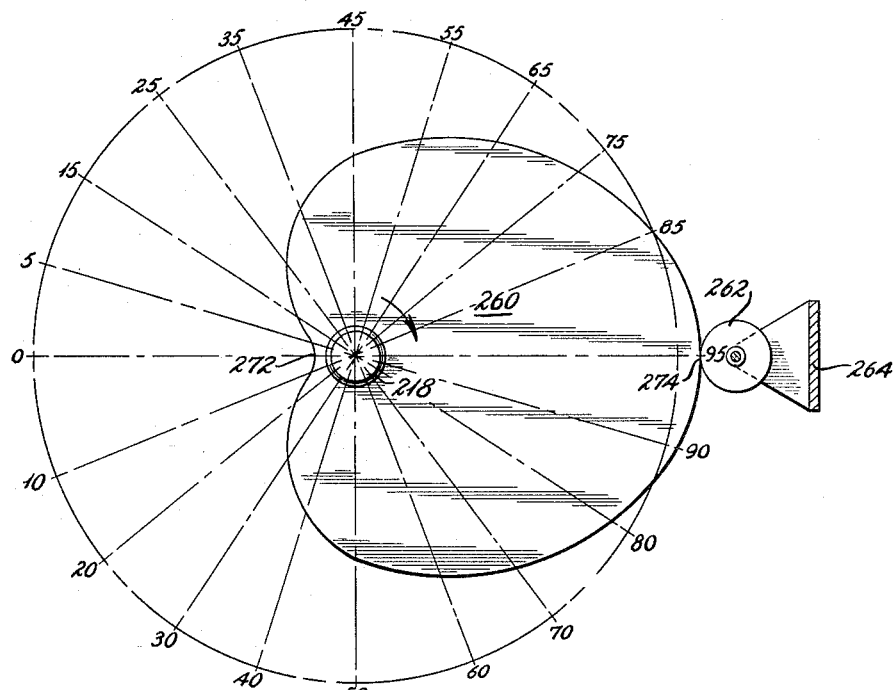
Figure 11:
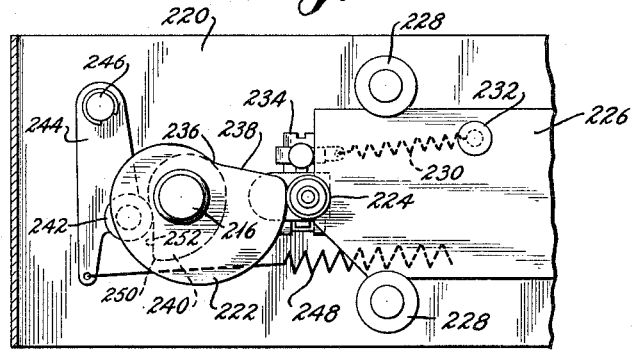

FIG. 5 taken on the line 7—7 of FIG. 5 with certain parts omitted for the sake of clarity;

FIG. 8 is a partial plan view taken approximately from the line 8—8 of FIG. 6 showing certain details of the decoding wheel;

FIG. 9 is a schematic view of the pawl and ratchet mechanism of FIG. 5 showing certain details of the latching mechanism and the electrical control circuit;

FIG. 10 is a detail view of the fine tuning cam taken approximately on the line 10—10 of FIG. 1;

FIG. 11 is a detail view of the coarse turning control cam taken approximately on the line 11—11 of FIG. 1; and FIG. 12 is a schematic diagram of the electrical connections between a numeral wheel and decoding disc.

Referring first to FIG. 1, a typical system embodying the invention includes a control box designated generally 20 which will be located at some position convenient to the operator. The control box is employed to select a particular frequency to which a communications transmitter or receiver is to be tuned and, in the embodiment shown, includes a coarse tuning knob 22 which tunes the apparatus to whole megacycles and a fine tuning knob 24 which is employed to tune the apparatus in fractional portions of megacycles. In the particular system shown, the coarse control knob 22 may select any value between 118 and 135 megacycles, the particular position of control knob 22 being indicated by a coarse numeral wheel 26 which positions the numeral corresponding to the setting of control knob 22 opposite a viewing window 28. Fine tuning knob 24 positions a fine numeral wheel 30 which in this particular instance selects fractional portions of megacycles from .00 megacycle to .95 megacycle in steps of .05 megacycle. As best shown in FIG. 1, numeral wheels 26 and 30 are so arranged that the complete setting, as for example 118.00 megacycles, is exhibited within viewing aperture 28 as a single and continuous number.

Setting of the course and fine tuning knobs positions certain switching or coding contacts within control box 20 and various contacts are connected in a manner to be described below by a suitable cable 32 to a controlled shaft positioning mechanism designated generally 34 which includes a schematically illustrated drive motor 36. Two shaft positioning mechanisms are included with the controlled shaft driving mechanism 34, one shaft being associated with the coarse circuit tuning elements and the other with the fine circuit tuning elements. In each case the controlled shaft is rotated to position a coarse or fine crystal drum, 38 and 40 respectively, and to also tune certain circuit elements such as condensers 42, resistances or inductances such as 44 to resonance with the frequency of the particular crystal selected.

Details of control box 20 may be best appreciated by reference to FIGS. 2, 3 and 4. The control box includes a main frame member 50 consisting of a plate-like member having a horizontal portion 52 and a vertical portion 54 connected at their adjacent ends by an inclined portion 56 which provides a convenient location to support various electrical contacts such as 58. Adjacent each side edge, a pair of upstanding side plates 60 are fixedly secured to horizontal portion 52 and project upwardly from portion 52 to support a horizontally extending shaft 62. A pair of numeral wheel assemblies are rotatably supported upon shaft 62 for rotation independent of each other. The two numeral wheel assemblies are generally similar except they are arranged in right and left-handed arrangement. Therefore, like reference numerals are employed to designate like elements in the two assemblies.

The numeral wheels are constructed from a clear plastic material, preferably a light transmitting material such as Lucite, which is rotatably fixed upon a sleeve or bushing 64 which is either integral with or fixedly secured to a gear and detent wheel element 66. Element 66 may be made up of one or more parts if desired. A numeral wheel retaining ring 68 overlies the opposite side of the numeral wheel and is in turn secured to bushing 64 as by staking. Preferably, the outer faces of the numeral wheels (FIG. 3) are provided with a seat for a printed circuit coding plate 70 which is fixed to and rotates with numeral wheel 26 and is engaged by stationary contacts 71 on the control box frame to indicate the rotative position of the numeral wheel.

Each numeral wheel is driven in rotation by means of a shaft 72 which is rotatably supported within the upwardly projecting legs of a U-shaped bracket 74 fixedly mounted upon horizontal portion 50 of the main frame of the control box. A gear 76 (FIG. 4) is rotatively fixed to each shaft 72 and meshes with the gear section 78 on the adjacent numeral wheel assembly. It is believed apparent from a comparison of FIGS. 1 and 3 that the control knobs 22 and 24 will be fixed to the respective shafts 72 after the control box housing is in place. A pair of spring pressed detent balls 80 are mounted in housings 82 secured upon one of the side plates 60 at a location where they engage the teeth of the detent wheel section 84 of the numeral wheel assembly to define rotative rest positions of the wheel corresponding to each frequency valve. Since in the particular embodiment shown, the coarse tuning mechanism selects any whole megacycle value between 118 and 135 megacycles, there are 18 positions of numeral wheel 26 and thus 18 separate notches in the detent wheel 84 fixed to wheel 26.

Aside from the opposite hand of the corresponding elements the coarse and fine sections of the control box, the number of notches on the respective detent wheels is the only substantial point of structural distinction. The fine tuning mechanism is arranged to select fractional portions of megacycles between .00 and .95 in .05 megacycle steps, therefore there are 20 notches on the fine detent wheel 86.

A plate-like element 86 of insulating material is employed to support the wiping contacts 71 which engage the associated printed circuit elements 70 on the respective numeral wheels.

In order to prevent rotative movement of one numeral wheel from being frictionally transmitted to the other, a thin washer such as 88 is preferably located between the facing collars 68.

Numeral wheels 26 and 30 are rotatable upon shaft 62 independently of each other. However, because of their coaxial rotation and by orienting the wheels with each other, the two separate numerals indicating the respective whole and fractional portions of the selected frequency are displaced, as shown in FIG. 1, as a single number. Since the respective coarse and fine tuning knobs are located adjacent the numeral wheel which they control, confusion in tuning is eliminated.

Referring now to FIGS. 5–9 and especially FIG. 5, the mechanism for positioning the coarse and fine tuning shafts includes a frame plate 100 which is supported by any suitable means in fixed relationship to the circuit elements to be tuned. A coarse controlled shaft 102 and a fine controlled shaft 104 are rotatably supported in plate 100. As was the case with the numeral wheel assemblies, a pair of like mechanisms are employed to respectively rotate shaft 102 and shaft 104 to the rotative position selected by operation of the associated coarse or fine control knob. Since each of the mechanisms is identical, like reference numerals will be employed to designate the corresponding parts of the two assemblies.

Referring now to FIG. 5, each of shafts 102 and 104 has a ratchet 106 supported upon the shaft for rotation relative to the shaft. Ratchet 106 is mounted upon the controlled shaft between the upper surface of frame plate 100 and an index wheel 108 which is rotatively fixed to the shaft. Index wheel 108 is in turn coupled to ratchet 106 by means of a pair of tension springs 110 each of which is connected between a lug such as 112 on wheel 108 and a pin 114 which is fixedly secured to the associated ratchet wheel 106 and projects through suitably located slots 116 cut in index wheel 108. The tension exerted by springs 110 is such that normally no relative rotary movement occurs between ratchet 106 and index wheel 108—in other words the resistance of elements coupled to the control shafts 102 or 104 to rotation is insufficient to displace pins 114 from the respective ends of the slots at which they are shown in FIG. 5. However, if index wheel 108 is physically locked against rotation, it is possible for ratchet wheel 106 to be rotated in a direction urging pins 114 away from the ends of the slot which they engage in FIG. 5.

Each ratchet wheel 106 is driven in rotation by pawl assembly 118 which is pivotally supported upon the frame plate 100 by a pivot pin assembly designated generally at 120. Each pawl assembly 118 includes a lever 122 which is supported upon pivot pin 120 at one end and in turn supports a pawl arm 124 at its opposite end. Pawl arm 124 is pivotally supported upon lever arm 122 by a suitable pin 126 and is rotatively biased in a direction urging the outer end of pawl arm downwardly toward the associated ratchet wheel by means of a torsion spring 128. At the outer end of arm 124 a suitable tooth 130 is formed upon arm 124. To maintain tooth 130 in alignment with the teeth of ratchet wheel 106, a pair of plates such as 132 are fixed upon each side of arm 124 and project beyond tooth 130, the outer periphery of ratchet wheel 106 being slidably engaged between the opposed inner surfaces of plates 132.

Pawl assembly 118 is driven in oscillating pivotal movement about pivot 120 by a cam 134, which may be of circular configuration, eccentrically mounted upon a rotatable drive shaft 236 driven in rotation by motor 36 (FIG. 1). A roller 138 is rotatably mounted upon lever 122 at a location to engage the peripheral surface of cam 134. When either of shafts 102 or 104 is being driven to a selected rotative position, the roller 138 on the associated pawl is biased into engagement with the the peripheral surface of the cam by means of a tension spring 140 which may be conveniently coupled directly between the respective lever arms 122. As shown in FIG. 5, shaft 104 has already reached the selected rotative position while shaft 102 (associated with the left-hand pawl and ratchet assembly of FIG. 5) is in the process of being driven to its selected rotative position.

In addition to pawl assembly 118, each ratchet wheel 106 is engaged by a second or holding pawl 142 which is pivotally supported upon frame plate 100 by a suitable pivot 144. As is the case with pawl tooth 130, the tooth 146 of pawl 142 is overlapped by a pair of plates such as 148 which project beyond the pawl tooth to slideably engage ratchet wheel 106 on opposite sides adjacent the periphery of the wheel to maintain tooth 146 in alignment with the teeth of wheel 106. A torsion spring 150 is coupled between a fixed pin 152 on frame plate 100 and pawl 142 to bias tooth 146 against the periphery of wheel 106. The purpose of pawl 142 is to hold its engaged ratchet wheel 106 against retrograde movement—i.e. rotation in a direction opposite to the direction ratchet wheel 106 is driven by its associated driving pawl assembly 118.

As best seen in FIG. 7, index wheel 108 is dished upwardly away from ratchet wheel 106 as at 154 so that the peripheral surface of index wheel 108 is spaced above the peripheral surface of ratchet wheel 106 to provide clearance between the outer edge of index wheel 108 and the various guide plates such as 132 and 148 of the driving and holding pawl assemblies 118 and 142. Returning now to FIG. 5, a plurality of equally spaced notches 155 are cut into the peripheral surface of index wheel 108. Notches 155 are shaped to receive an index pin 156 which projects downwardly from the outer end of an index arm 158 supported at its opposite end for pivotal movement upon pivot pin assembly 120. Index arm 158 is supported upon pivot pin assembly 120 for pivotal movement independently of lever 122 of the driving pawl assembly, however, arm 158 and lever 122 are resiliently coupled by means of a torsion spring 160. One end of spring 160 is coupled to a pin 162 fixed to arm 122 and projecting upwardly from the arm through an opening 164 in index arm 158; the opposite end of torsion spring 160 bears against the upward projection of pin 156. Thus, spring 160 biases arm 158 relative to lever 122 in a direction such that pin 162 normally bears against that side of opening 164 remote from the adjacent index wheel. As best appreciated from the left-hand pawl and ratchet assembly of FIG. 5, spring 160 permits relative pivotal movement between lever 122 and arm 158 so that index pin 156 may ride along the periphery of index wheel 108 between adjacent notches 155 as pawl assembly 118 is pivoted about pivot pin 120 during its cycle of driving movement. When the pawl assembly 118 is latched, as is the case with the right-hand pawl and ratchet assembly shown in FIG. 5, spring 160 acts to bias index pin 156 against the bottom of the engaged notch 155.

Further, in order to assure that the associated control shaft is rotated through a complete step upon each oscillation of the pawl, the angular increment imparted to ratchet wheel 106 by each driving stroke of the pawl is greater than the angular displacement between two adjacent notches 155 in index wheel 108. Thus, a slight amount of relative movement occurs between the wheels and arms at the end of each driving stroke.

Since both pawl and ratchet mechanisms are driven from a common drive means—i.e. cam 134—it is necessary to provide mechanism for disengaging the pawl assemblies from cam 134 because normally one of the controlled shafts 102 and 104 will arrive at its desired rotative position before the other. The latching mechanism includes a pin 166 which is fixed upon lever 122 and projects upwardly from the lever. At its upper end, a latch engaging face 168 is cut into the pin to provide a shoulder which may be engaged by a movable latch tooth 170. Tooth 170 is mounted at the outer end of a pivoted armature 172 which is supported for pivotal movement upon a bracket 174 supported above index wheel 108 from a pair of posts 176 mounted upon the frame plate 100. In FIG. 5, the latching mechanism associated with the right-hand pawl and ratchet mechanisms have been removed. Armature 172 is located clear of the path of latch pin 166 when a solenoid coil 178, also mounted upon bracket 174, is energized. An arm 180 is fixed to armature 172 and engages a leaf-spring contact 182 whose resiliency provides the biasing force necessary to pivot armature 172 upwardly into the path of latch pin 166 when solenoid 178 is de-energized. Contact arm 182 and associated contact arms 184 and 186 are mounted in a block of insulating material 188 which is likewise supported from bracket 174.

As best seen in FIG. 6, bracket 174 is supported from each of posts 176 by means of a bolt 190 which is threadably received within each post. Above and below each bolt 190, a pair of set screws 192 are threaded through post 176 to engage bracket 174 above and below bolt 190. By adjustment of set screws 192, the position of bracket 174 and the structure mounted upon the bracket may be readily adjusted with respect to the path of latch pin 166.

As best seen in FIG. 6, each of controlled shafts 102 and 104 project downwardly below frame plate 100. A commutator-like decoding wheel assembly 200 is fixedly secured to each shaft. Each of the decoding wheel assemblies is similar and the structure of each wheel may be best appreciated by reference to FIGS. 7 and 8 wherein details of the wheel 200 mounted upon shaft 104 are shown.

As best shown in FIG. 8, wheel 200 includes a generally circular metallic or electrically conductive base plate 202 which is fixedly mounted upon shaft 104. An annular ring of electrical insulating material 204 is mounted upon plate 202 and a second metallic or electrically conductive plate 206 is in turn mounted upon the opposite side of insulating ring 204. Referring now to FIG. 8, it is seen that the peripheral edges of plates 202 and 206 are divided into contact segments 208 and 209 respectively of varying circumferential extent by notches 210 in plate 202 and notches 211 in plate 206. Notches 211 in plate 206 are substantially circumferentially coextensive with the contact segments 208 of plate 202. Thus, the outermost periphery of decoding wheel assembly 200 is alternately defined by the contact segments 208 and 209 of plates 202 and 206. As best seen in FIG. 8, the radius of contact segments 209 of plate 206 is slightly greater than the radius of contact segments 208 and contact segments 209 extend angularly somewhat beyond each end of each notch 210 in plate 202.

As best seen in FIGS. 6 and 7, the peripheral edges of the decoding wheel assembly are engaged by a plurality of stationary electrical contacts such as 212 so that as decoding wheel 200 is rotated each contact 212 is shifted between engagement with contact segments 208 and 209. Although one contact 212 is shown in FIG. 8, a plurality of contacts 212 are supported from a fixed block of insulating material (not shown) to slideably engage the circumference of the decoding wheel at spaced locations. A downwardly projecting ear 214 is formed on the plate 202 to engage a cooperating recess in the associated crystal drum 38 or 40 (see FIG. 1) to transmit rotation of shaft 104 to its associated crystal drum 40.

Each of controlled shafts 102 and 104 is rotatively coupled, through the associated decoding wheel and crystal drum to an associated tuning shaft 216 and 218 respectively. Shafts 216 and 218 are supported in the fixed frame 220 of the apparatus for rotation and serve to rotate cams employed in the tuning of electrical circuit elements.

Referring now to FIGS. 1 and 11, a spiral cam 222 is fixed to the lower end of shaft 216 at a location where the peripheral surface of cam 222 engages a follower roller 224 mounted upon a slide member 226 which is supported for reciprocating movement relative to frame 220 as by a plurality of rollers 228.

Slide 226 is resiliently biased to the left in FIG. 11 to maintain roller 224 in engagement with the peripheral surface of cam 222 by suitably arranged springs including a spring 230 connected between a lug 232 on slide 226 and an arm 234 which is pivotally supported upon fixed frame 20 and forms a portion of the actuating mechanism for the left hand condenser 42 in FIG. 1.

The peripheral surface of cam 222 continually increases in radius from the axis of shaft 216 from a minimum radius point 236 to a maximum radius point which in FIG. 11 is substantially in engagement with roller 224. A relatively steep and straight transition surface 238 extends between the minimum radius point and maximum radius point and corresponds to the transition between a setting of 135 megacycles on the coarse control input to a setting of 118 megacycles.

Because of the one-way rotation imparted to shaft 216 by the pawl and ratchet mechanism described above, as shaft 216 is rotated in a clockwise direction as viewed in FIG. 11, roller 224 passes beyond the upper or outer portion of transition surface 238 and, because of the substantial biasing forces exerted by the various springs urging slide member 226 toward shaft 216, the reaction between roller 224 and transition surface 238 exerts a force tending to accelerate the clockwise rotation of cam 222 above the axis of shaft 216. Also, because of the greatly reduced force acting in opposition to the resilient biasing force, a substantial force tending to accelerate roller 224 in movement to the left in FIG. 11 is developed. The combination of these two forces is such that ordinarily roller 224 would bottom at minimum radius point 236 with a substantial force. To eliminate this bottoming or slapping, an anti-slap cam 240 is fixedly mounted on shaft 216.

Cam 240 is formed with a spiral peripheral surface which is engaged by a follower roller 242 mounted upon a lever 244 pivotally supported at 246 on frame 220. A tension spring 248 is connected between the opposite end of arm 244 and a convenient location, not shown, on slide 226 to continuously bias roller 242 against the surface of cam 240. As is the case with cam 222, the peripheral surface of cam 240 is one of continually increasing radius from a minimum radius point engaged by roller 242 in FIG. 11 to a maximum radius point 250 which is connected to the minimum radius point by means of a substantially flat transition surface 252. Cam 240 is of the opposite hand compared to cam 222—in other words, the angular direction in which the radius of the peripheral surface of cam 240 increases is opposite to the angular direction of increasing radius in cam 222. Likewise, transition surface 252 is oriented on shaft 216 with respect to transition surface 238 in such a fashion that roller 242 traverses transition surface 252 in an increasing radial direction from shaft 216 at the same time that roller 224 moves radially inwardly along transition surface 238.

As roller 42 moves relative to cam 40 outwardly along transition surface 52, an increasing force urging shaft 216 in a counterclockwise direction is developed to counterbalance the clockwise force developed by the transit of roller 224 along transition 238. The counterbalancing force exerted by spring 248 through roller 242 in transition surface 252 of cam 240 thus prevents the acceleration and slapping of roller 224 against minimum radius point 236 on cam 222.

Details of the fine tuning cam 260 mounted at the lower end of control shaft 218 are best shown in FIG. 10. Fine tuning cam 260 is engaged along its peripheral surface by a follower roller 262 which is mounted upon a rod assembly 264 supported for reciprocating movement on frame 220. Suitably located spring means 266 act between frame 220 and rod assembly 264 to continuously bias roller 262 into engagement with the peripheral surface of cam 260. Rod assembly 264 carries a plurality of tuning slugs 268 which are located to be positioned within the turns of tuning coils 270.

As stated above, the fine tuning mechanism functions to tune the transmitter or receiver to fractional portions of a whole megacycle, in the specific embodiment shown the adjustment provided is for a tuning effect from .00 megacycle to .95 megacycle in steps of .05 megacyle. Thus, shaft 218 may be set at any one of twenty equally spaced rotative rest positions angularly spaced from each other by 360° divided by 20 or 18°. Because of the fractional nature of the control input of the fine tuning mechanism and the one-way direction of rotation of shaft 218, it is frequently necessary for the mechanism in proceeding to a new setting to pass the transition point between .95 magacyle and .00 megacycle. In order to eliminate a steep transition surface comparable to transition surface 238 of cam 222, the peripheral surface of cam 250 is of a generally heart-shaped configuration as opposed to the spiral configuration of cam 222.

Cam 260 is rotatively fixed to shaft 218 and its peripheral surface includes a minimum radius point 272 corresponding to a control setting of .00 megacycle. In FIG. 10, various radial lines have been drawn from the axis of shaft 218 to intersect the peripheral surface of cam 260 at respective points corresponding to the points engaged by follower roller 262 when the shaft 218 is in any of the various corresponding rotative rest positions. The fine tuning setting or correction applied is directly proportional to the radius from the axis of shaft 218 to the respective points of intersection of the radial lines of FIG. 10 and the peripheral surface of cam 260. As best shown in FIG. 10, the peripheral surface of cam 260 increases in radius from minimum radius point 272 to a maximum radius point 274 by having the respective radii to points corresponding to even numerated fractional portions of a unit control input—i.e., .10, .20, .30 megacycle—lying on one side of a radial line passing through the axis of shaft 218 and minimum radius point 272 and having the various radii corresponding to odd numerated fractional portions— i.e., .05, .15, .25 megacycle—lying on the opposite side of the line passing through the axis of shaft 218 and minimum radius point 272. Briefly stated, successive portions of cam 260 correspond to alternate settings of the fine tuning control.

Because shaft 18 is rotated, in a single direction by the pawl and ratchet mechanism, to change the setting of the fine tuning mechanism from the indicated setting in FIG. 10 of .95 megacycle to a setting of .85 megacycle, it would be necessary to rotate shaft 218 only one step in a clockwise direction. However, to change the setting from .95 megacycle to .90 megacycle it would be necessary to rotate shaft 218 through 19 steps of 18° apiece in a clockwise direction. Because of the configuration of the peripheral surface of cam 260, there is no major change in radius of the peripheral surface between any adjacent steps corresponding to the transition surface 238 of cam 222.

To control the operation of drive motor 36, each numeral wheel within the control box is electrically coupled to the associated decoding wheel in the manner shown in FIG. 12 in which a schematic representation of the electrical connections between the coarse numeral wheel 28 and the coarse decoding wheel 200 is shown. Since a generally similar electrical coupling system is employed with the fine numeral wheel and fine decoding wheel, only the system employed with the coarse control elements will be described. Letters C and F are employed to distinguish between corersponding parts of the coarse and fine systems.

Coarse numeral wheel 26 includes a printed circuit consisting of two electrically separate sections 70A and 70B of irregular and generally complementary shape. A series of ten wiping contacts 71A through 71E inclusive and 71A' through 71E' inclusive are supported in fixed relationship to the axis of numeral wheel 26 by the adjacent insulated support plate 86. Sections 70A and 70B of the printed circuit are so shaped that at each rotative rest position of wheel 26 established by its associated detent assembly, a different combination of connections between the wiping contacts 71A–E and printed circuit sections 70A and 70B is established.

Five wiping contacts 212A through 212E are supported in wiping engagement with the coarse decoding wheel 200C. The shape of the contact engaging segments of the plates 202 and 206 respectively correspond to the general shapes of printed plates 70A and 70B. Each of wiping contacts 212A through E is connected through cable 32 to the movable member of a two position switch designated generally 280 which is mounted in the control box and movable from the position shown in FIG. 12 wherein contacts 212A through E are respectively connected to contacts 71A through E to an alternative position wherein contacts 212A through E are respectively connected through switch 280 to contacts 71A' through E'.

With numeral wheel 26 and coarse control shaft 102 in the respective positions shown in FIG. 12 and switch 280 positioned as shown, the rotative rest position of shaft 102 corresponds to the setting indicated by the numeral on numeral wheel 26 exposed within viewing aperture 28. In this position, it will be noted that contacts 71A and 71C are engaged with printed circuit portion 70A which is grounded and contacts 212A and 212C are engaged with plate 202 which is likewise grounded. Contacts 71B, D and E are engaged with circuit portion 70B and are respectively connected through switch 280 to contacts 212B, D and E engaged with plate 206 of the decoding wheel. Plate 206 of the decoding wheel is permanently connected, through a brush 282, to one side of solenoid coil 178C. The other side of the coil is permanently connected to the high side of a grounded electrical power source LV. With numeral wheel 26, switch 280 and shaft 102 in the respective positions shown in FIG. 12, solenoid coil 178C would be de-energized since none of contacts 212B, D and E engaged with plate 206 are connected to ground by any of contacts 71B, D and E.

The purpose of switch 280 is to permit an immediate shift in frequency setting of the transmitter or receiver of six megacycles without requiring coarse control knob 22 to be rotated. By shifting switch 280 the respective connections of contacts 212A through E are switched to contacts 71A' through E'. Solenoid coil 178C is immediately energized upon the shift of switch 280 since contacts 212B, D and E are respectively shifted from communication with contacts 71B, D and E into communication with contacts 71B', D' and E'. Contacts 71D' and 71E' are both engaged with grounded printed circuit section 70A, hence a circuit from the positive side of power source LV is completed through coil 178C to ground at printed circuit plate 70A. Solenoid coil 178C picks up its armature 172C to locate contacts 182C, 184C and 186C in the position shown in FIG. 9.

Motor 36 is energized from power supply LV through the engaged contacts 182C and 184C and supply line 300 and thus drives cam 134 in rotation to oscillate pawl assembly 118C. Pawl 118C drives its associated ratchet and index wheel to rotate shaft 102 in step-by-step rotation until shaft 102 reaches the position corresponding to the frequency selected at the control box.

When this position is reached, the contact combination between the wiping contacts and the grounded portions of decoding wheel 200C and numeral wheel 26 is the same, thus opening the circuit through solenoid coil 178C. When the solenoid is de-energized, armature 172C is released into latching engagement with latch dog 166C on pawl assembly 118C, thereby permitting contact 182C to be disengaged from contact 184C to thereby open the circuit to motor 36. Shaft 102 is positively latched at the selected rotative position by the engagement between index pin 156 and the corresponding notch in the associated index wheel. An exactly similar operation occurs when numeral wheel 26 is manually rotated to a new position.

Operation of the fine tuning mechanism is substantially similar. Hence a description of the operation of the fine tuning mechanism will be omitted.

When both coarse and fine control settings are changed, the usual case finds one of the two tuning mechanisms reaching its desired new position before the other. From the description above, it is seen that the coarse tuning mechanism will drive after the fine tuning mechanism has reached its desired position. When both systems are driving to a new position, both contacts 182C and 182F are respectively engaged with contacts 184C and 184F. In this situation, motor 36 is energized through the mating engagement of contacts 182C and 184C. Thus motor 36 will remain energized until the coarse tuning mechanism has arrived in its desired rotative rest position. Should the coarse tuning mechanism arrive at its desired rotative position before the fine tuning mechanism, arrival of the coarse tuning mechanism at its selected position de-energizes solenoid 178C to break the circuit through contacts 182C and 184C and establish contact between contact 182C and contact 186C. Contact 186C is connected to contact 182F, hence motor 36 is energized as long as contact 182F remains in engagement with contact 184F. This situation will continue as long as solenoid 178F remains energized.

The pawl assembly 118 associated with whichever of the two mechanisms first reaches its desired position is latched by the de-energization of the associated solenoid so that continued rotation of cam 136 does not shift the associated control shaft. Since the pawl assembly 118 must be driven beyond the engaging latch tooth by cam 134, the pawl when latched is not completely clear of the path of the maximum radius portion of cam 134 as indicated by the dotted line R in FIG. 5. The pawl assembly is held, however, at a position where index pin 156 is fully seated in the notch of the index wheel 108 which, as will be recalled, is rotatively fixed to the associated control shaft.

Assuming a situation where the right-hand pawl assembly 118 is latched as in FIG. 5 while the left-hand pawl assembly 118 is still being driven, it is seen that continued rotation of cam 134 will oscillate pawl 118 through a small angle during each rotation of cam 134. This oscillation of pawl 118 will cause some relative rotation between ratchet wheel 106 and index wheel 108. This relative rotation is permitted by springs 110 which resiliently couple pawl 106 to index wheel 108. Each time the pawl is oscillated by the cam, the right-hand ratchet wheel 106 (FIG. 5) may rotate slightly in a clockwise direction to move pins 114 away from the ends of slots 116. Relative movement between pawl lever 122 and index arm 158 is also permitted, torsion spring 160 permitting pin 162 to move away from the left-hand side of the opening in the right-hand index arm of FIG. 5 as the pawl assembly is oscillated.

While I have described but one embodiment of my invention, it will be apparent to those skilled in the art that the disclosed embodiment may be modified. Therefore, the foregoing description is to be considered exemplary rather than limiting and the true scope of the invention is that defined in the following claims.

I claim:
1. Control apparatus comprising a frame, a shaft rotatably supported in said frame, ratchet means rotatively coupled to said shaft, pawl means pivotally supported upon said frame for engagement with said ratchet means, drive means operable when energized to oscillate said pawl means about its pivotal support to rotatively advance said ratchet means through a given angular increment upon each oscillation of said pawl means, input means for selecting a desired rotative position of said shaft, means on said shaft for indicating the rotative position of said shaft, means coupled to said input means and said shaft position indicating means for energizing said drive means until said shaft is located in said desired rotative position, and latch means operable to latch said pawl means in engagement with said ratchet means to latch said shaft in desired rotative position upon the de-engerization of said drive means.

2. Control apparatus as defined in claim 1 wherein said drive means comprises a drive shaft driven in rotation when said drive means is energized, an eccentric cam mounted on said drive shaft for rotation therewith, and means biasing said pawl means into engagement with said cam whereby rotation of said drive shaft drives said pawl in oscillating movement about its pivotal support.

3. Control apparatus comprising a frame, a shaft rotatably supported in said frame, a drive ratchet mounted upon said shaft for rotation relative to said shaft, an index wheel fixedly mounted on said shaft for rotation therewith, resilient means rotatively coupling said drive ratchet to said index wheel, a drive pawl pivotally supported upon said frame for engagement with said drive ratchet, an indexing pawl pivotally supported upon said frame for movement into and out of locking engagement with said index wheel, drive means operable when energized to oscillate said drive pawl about its pivotal support to rotatively advance said drive ratchet through a given angular increment upon each oscillation of said drive pawl, resilient means coupling said index pawl to said drive pawl to bias said index pawl into locking engagement with said index wheel during each driving stroke of said drive pawl to limit the rotative advancement of said shaft upon each oscillation of said drive pawl to a fixed angular increment less than said given angular increment, input means for selecting a desired rotative position of said shaft, means on said shaft for indicating the rotative position of said shaft, means connected to said drive means through said input means and said shaft position indicating means for energizing said drive means when the rotative position of said shaft differs from said desired rotative position and for de-energizing said drive means when said shaft is located in said desired rotative position and means for latching said index pawl in engagement with said index wheel when said drive means is de-energized.

4. Control appartus comprising a frame, a pair of control shafts mounted in said frame for independent rotation, a ratchet rotatively coupled to each of said pair of shafts, first pawl means mounted on said frame adjacent one of said ratchet means, second pawl means mounted on said frame adjacent the other of said ratchet means, a rotatable cam engageable between said first and said second pawl means, drive means operable when energized to rotate said cam to oscillate said first and said second pawl means to rotatively advance both of said ratchet means and the control shafts respectively coupled thereto through given angular increments upon each oscillation of the respective pawl means, input means for independently selecting desired rotative positions of both of said control shafts, means on each of said control shafts for indicating the rotative position of the shaft, means connected to said common drive means through said input means and both of said shaft position indicating means for energizing said drive means when the rotative position of either of said control shafts differs from the desired rotative position selected by said input means and for de-energizing said drive means when both of said control shafts are in their desired rotative positions, first latch means located adjacent said first pawl means for latching said first pawl means against oscillation when said one of said control shafts reaches its desired rotative position, and second latch means located adjacent said second pawl means for latching said second pawl means against oscillation when said other of said control shafts reaches its desired rotative position.

References Cited in the file of this patent

UNITED STATES PATENTS

| | | |
|---|---|---|
| 2,252,487 | Bevill | Aug. 12, 1941 |
| 2,297,090 | Weaver | Sept. 29, 1942 |
| 2,311,649 | Elliott | Feb. 23, 1943 |
| 2,517,142 | Staley | Aug. 1, 1950 |
| 2,542,947 | Rowe | Feb. 20, 1951 |
| 2,567,735 | Scott | Sept. 11, 1951 |
| 2,802,979 | Stover | Aug. 13, 1957 |
| 2,833,976 | Kennedy et al. | May 6, 1958 |
| 2,874,672 | Hamm | Feb. 24, 1959 |
| 2,888,624 | Stover | May 26, 1959 |
| 2,918,615 | Goetz | Dec. 22, 1959 |